United States Patent
Nidugala et al.

(10) Patent No.: US 10,652,327 B2
(45) Date of Patent: May 12, 2020

(54) MIGRATION OF VIRTUAL MACHINES

(71) Applicant: Hewlett Packard Enterprise Development LP, Houston, TX (US)

(72) Inventors: Murali Nidugala, Bangalore (IN); Kalapriya Kannan, Bangalore (IN); Hariharan Krishna, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/399,789

(22) Filed: Jan. 6, 2017

(65) Prior Publication Data

US 2017/0315838 A1  Nov. 2, 2017

(30) Foreign Application Priority Data

Apr. 29, 2016  (IN) .............................. 201641014989

(51) Int. Cl.
| | |
|---|---|
| *G06F 9/455* | (2018.01) |
| *H04L 29/08* | (2006.01) |
| *H04L 12/24* | (2006.01) |
| *G06F 9/50* | (2006.01) |
| *H04L 12/26* | (2006.01) |

(52) U.S. Cl.
CPC ........ *H04L 67/1095* (2013.01); *G06F 9/5088* (2013.01); *H04L 41/0896* (2013.01); *H04L 41/5009* (2013.01); *H04L 43/0817* (2013.01); *Y02D 10/32* (2018.01)

(58) Field of Classification Search
CPC .. G06F 9/5077; G06F 11/203; G06F 11/2035; G06F 9/5033
See application file for complete search history.

(56) References Cited

U.S. PATENT DOCUMENTS

| | | | |
|---|---|---|---|
| 8,095,929 | B1 | 1/2012 | Ji et al. |
| 8,209,687 | B2 | 6/2012 | Yuyitung et al. |
| 8,244,957 | B2 | 8/2012 | Eidus et al. |
| 8,402,462 | B2 | 3/2013 | Ciano et al. |
| 8,478,961 | B2 | 7/2013 | Bozek et al. |
| 8,566,825 | B2 | 10/2013 | Bozek et al. |
| 8,949,428 | B2 | 2/2015 | Dow et al. |
| 9,210,100 | B2 | 12/2015 | Van Der et al. |
| 2008/0320269 | A1* | 12/2008 | Houlihan .............. G06F 9/4856 711/203 |

(Continued)

OTHER PUBLICATIONS

Anand, A. et al., "Virtual Machine Placement Optimization Supporting Performance SLAs", (Research Paper), Sep. 18, 2013, 8 pages.

(Continued)

*Primary Examiner* — Dong U Kim

(74) *Attorney, Agent, or Firm* — Hewlett Packard Enterprise Patent Department

(57) ABSTRACT

The present subject matter relates to migrating a virtual machine (VM) from a source server to a destination server. The migration involves computation of a suitability score for each particular server in the plurality of candidate servers. The suitability score for a server indicates the suitability of the server to host the VM. In an example implementation, the suitability score for a server is computed based on satisfaction of at least one criterion for operation of the VM by the server.

17 Claims, 7 Drawing Sheets

(56) References Cited

U.S. PATENT DOCUMENTS

| | | | |
|---|---|---|---|
| 2009/0070771 A1* | 3/2009 | Yuyitung | G06Q 10/06 718/105 |
| 2012/0324112 A1* | 12/2012 | Dow | G06F 9/5033 709/226 |
| 2013/0305242 A1 | 11/2013 | Wang et al. | |
| 2014/0052864 A1* | 2/2014 | Van Der Linden | G06F 9/5077 709/226 |
| 2014/0280961 A1 | 9/2014 | Martinez et al. | |
| 2015/0295792 A1* | 10/2015 | Cropper | H04L 41/5022 709/226 |

OTHER PUBLICATIONS

Minarolli, D., "Utility-Based Allocation of Resources to Virtual Machines in Cloud Computing", (Research Paper), Mar. 2014, 183 pages.

Feller et al., HAL, A Case for Fully Decentralized Dynamic VM Consolidation in Clouds, Aug. 14, 2012 (25 pages).

Medina et al., A Survey of Migration Mechanisms of Virtual Machines, Jan. 2014 (33 pages).

Programmers Stack Exchange, Efficient algorithm for Virtual Machine (VM) Consolidation in Cloud dated on or before Sep. 5, 2015 (3 pages).

Sato et al., A Model-Based Algorithm for Optimizing I/O Intensive Applications in Clouds using VM-Based Migration, 2009 (6 pages).

Sekhar et al., Optimizing the Virtual Machine Migrations in Cloud Computing Systems by using Future Prediction Algorithm, Aug. 2014 (5 pages).

Strunk, Anja, Costs of Virtual Machine Live Migration: A Survey—Abstract Only, Jun. 2012 (2 pages).

Voorsluys et al., Cost of Virtual Machine Live Migration in Clouds: A Performance Evaluation, Sep. 2011 (12 pages).

VMware, "Understanding VMware vSphere (Registered) 5.1 Storage DRS (Trademark)", Technical Marketing Documentation, Mar. 2013, 23 pages.

VMware, "Distributed Resource Scheduler, Distributed Power Management", Available online at <https://www.vmware.com/in/products/vsphere/drs-dpm.html>, 2019, 4 pages.

Spata et al., "Virtual Machine Migration through an Intelligent Mobile Agents System for a Cloud Grid", Journal of Convergence Information Technology, vol. 6, No. 6, 2011, pp. 351-360.

Hirofuch et al., "Eliminating Datacenter Idle Power with Dynamic and Intelligent VM Relocation", Distributed Computing and Artificial Intelligence 7th International Symposium, pp. 645-648.

Anonymous, "VMware Distributed Resource Scheduler (DRS): Dynamic Load Balancing and Resource Allocation for Virtual Machines", Internet Article, 2009, 3 pages.

Huang et al., "High Performance Virtual Machine Migration with RDMA over Modern Interconnects", Proceedings of the 2007 IEEE International Conference on Cluster Computing, 2007, 10 pages.

* cited by examiner

| Criterion | Score |
|---|---|
| Criterion-1 | 7 |
| Criterion-2 | 9 |
| Criterion-3 | 10 |
| Criterion-4 | 2 |
| Criterion-5 | 5 |
| Criterion-6 | 4 |

Fig. 4(a)

| Criterion | Server-1 | Server-2 | Server-3 | Server-4 |
|---|---|---|---|---|
| Criterion-1 | ✓ | ✗ | ✓ | ✓ |
| Criterion-2 | ✓ | ✓ | ✓ | ✗ |
| Criterion-3 | ✓ | ✗ | ✓ | ✓ |
| Criterion-4 | ✗ | ✗ | ✓ | ✗ |
| Criterion-5 | ✗ | ✓ | ✗ | ✓ |
| Criterion-6 | ✓ | ✗ | ✗ | ✓ |
| Score | 30 | 14 | 27 | 26 |

Fig. 4(b)

MIGRATION OF VIRTUAL MACHINES

BACKGROUND

Virtual Machine (VM) is an emulation of a computing system. The VM is hosted on a computing system, such as a server, and utilizes resources, such as central processing unit (CPU), random access memory (RAM), and storage, of the computing system for its operations. The VM can be transferred or migrated from the computing system on which it is hosted to another computing system.

BRIEF DESCRIPTION OF DRAWINGS

The following detailed description references the figures, wherein:

FIGS. 4(a) and 4(b) illustrate calculation of suitability scores for a plurality of candidate servers, according to example implementations of the present subject matter.

DETAILED DESCRIPTION

Figure 1:
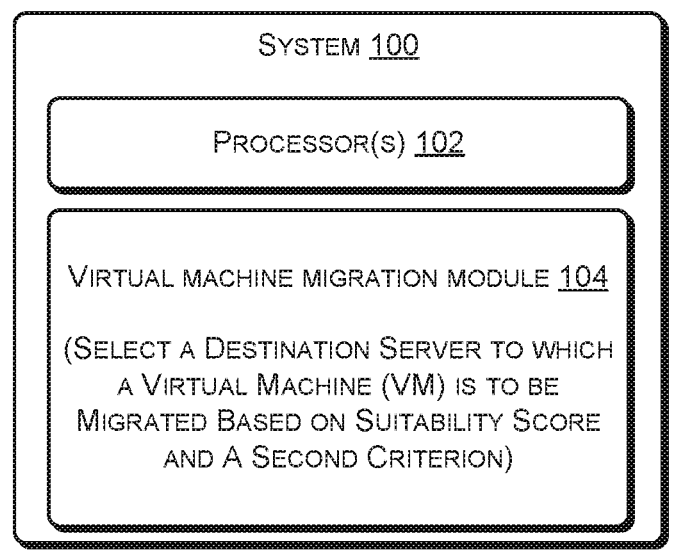
FIG. 1 illustrates a system that is to select a destination server to which a virtual machine (VM) is to be migrated, according to an example implementation of the present subject matter.

Virtual Machine (VM) is an emulation of a computing system. The VM is hosted on a host computing system. The host computing system can be, for example, a server or a personal computer (PC). The VM utilizes hardware resources, such as central processing unit (CPU), random access memory (RAM), and storage, of the host computing system for its operation. VMs are finding increasing acceptance owing at least to the flexibility they offer in terms of their creation, deletion, and replication, ability to be isolated from the host computing system, and ability to be recovered quickly, for example, using snapshots.

At times, a VM has to be transferred from the host computing system to a target computing system. The transfer of the VM from one computing system to another is referred to as VM migration. VM migration may be performed for a variety of reasons, such as degradation in health of the computing system or maintenance of the computing system.

The performance of the migrated VM on the target computing system depends on several factors. The factors include, but are not restricted to, availability of computational resources in the target computing system for the operation of the VM, ability of the target computing system to host VMs related to the VM, and compatibility between hardware resources in the target computing system and the VM. Many times, these factors may not be considered before migrating the VM. Even if these factors are considered, selecting a target computing system from a plurality of computing systems based on the consideration may be error prone if the number of computing systems is large, as some factors may not be considered for some of the target computing systems. This may result in migration of the VM to a non-suitable target computing system. Therefore, the VM may not have a satisfactory performance after its migration. Neither, it may be possible to guarantee a satisfactory performance of the VM after its migration.

Approaches for migration of virtual machines (VMs) are described. These approaches guarantee the performance of the VMs after their migration. These approaches may be implemented in various computing systems including networked computing systems, and computing systems that operate in or provide virtual environments.

In accordance with an example implementation of the present subject matter, for a VM being hosted on a source server, a set of criteria for operation of the VM and a score for at least one criterion of the set of criteria are received. A suitability score is computed for each particular server amongst a set of servers based on satisfaction of the at least one criterion by the particular server. The suitability score may be computed as a sum of scores of each criterion of the at least one criterion satisfied by the particular server. Based on is the suitability scores, a set of servers in the plurality of candidate servers is determined to be suitable for migration of the VM. From the set of servers, a destination server to which the VM is to be migrated may be selected based on a second criterion.

In accordance with an example implementation of the present subject matter, to determine whether the VM is to be migrated from the source server, performance metrics of the source server are obtained. From the performance metrics, service level agreement (SLA) parameters are derived, as explained later. Based on the SLA parameters, a determination is made that the VM is to be migrated from the source server.

Since the destination server to host the VM is selected based on the suitability of the destination server, the performance of the VM can be guaranteed after its migration to the destination server. Moreover, since the systems and methods of the present subject matter consider the satisfaction of the at least one criterion for each particular server, the suitability of each particular server in the plurality of candidate servers for hosting the VM can be determined without any errors, even if the number of servers is large.

The systems and methods of the present subject matter can be used in several situations where a VM is to be migrated from a computing system it is hosted on. The situations can be, for example, when a load or power consumption of the computing system is to be reduced, when health of the computing system degrades due to, for example, hardware failure, when the resources for usage by the VM for its operation increases and cannot be provided by the computing system, and when the computing system is a standalone computing system and the VM is to be migrated to a data center having several computing systems.

The following detailed description refers to the accompanying drawings. Wherever possible, the same reference numbers are used in the drawings and the following description to refer to the same or similar parts. While several examples are described in the description, modifications, adaptations, and other implementations are possible.

Accordingly, the following is detailed description does not limit the disclosed examples. Instead, the proper scope of the disclosed examples may be defined by the appended claims.

FIG. 1 illustrates a system to identify a destination server to which a virtual machine (VM) is to be migrated, according to an example implementation of the present subject matter. As illustrated, a system 100 includes processor(s) 102 and a VM migration module 104.

The processor(s) 102 may be implemented as microprocessors, microcomputers, microcontrollers, digital signal processors, central processing units, state machines, logic circuitries, and/or any devices that manipulate signals based on operational instructions. Among other capabilities, the processor(s) 102 may fetch and execute computer-readable instructions stored in a memory. The functions of the processor(s) 102 may be provided through the use of dedicated hardware as well as hardware capable of executing machine readable instructions.

The VM migration module 104 may be coupled to and/or be executable by the processor(s) 102, and may include, amongst other things, routines, programs, objects, components, data structures, and the like, which perform particular tasks or implement particular abstract data types.

In operation, the VM migration module 104 can receive a set of criteria for operation of the VM. The set of criteria may be prescribed by an expert who is aware of the operation of the VM. Some example criteria that form part of the set of criteria are server firmware-VM compatibility, ability of the server to support the VM and workloads running on the VM, availability of resources in the server for operation of the VM, compatibility of the VM with attributes of resources of the server, availability of storage area network (SAN) features to the server, compatibility of SAN type with the VM, processor availability for the VM, contiguous memory availability for the VM, processor-memory collocation, availability of virtualized functionalities on the server, ability of the server to host other VMs which are part of a group that the VM is also part of (VMs may be part of a group if they are dependent on each other due to, for example, association of an application or a database between them), availability of buffer resources on the server, ability of the server to utilize best available network traffic, such as 10 GigE or 40 GigE, between the server and the source server for migration of the VM, health of the server, and security policy. Here, server firmware-VM compatibility refers to compatibility between firmware of a server and the VM. The VM may not be compatible with firmware of servers of all generations. The server may not be able to support the VM or the workload on the VM due to, for example, the presence of obsolete operating system, firmware, and drivers in the server. The resources for usage by the VM for its operation include, but are not restricted to, an amount of CPU processing power, an amount of RAM memory, an amount of storage, and an amount of network bandwidth. For the CPU, the attributes include, but are not restricted to, CPU generation, clock frequency, and number of threads per core. SAN features include high availability of the SAN, SAN zoning, and Logical Unit Number (LUN) masking. Processor availability for the VM refers to the availability of cores of the CPU for operation of the VM. Contiguous memory availability refers to availability of contiguous chunks for the VM. Processor-memory collocation refers to availability of processor and memory allocated for the VM in the same node of the server. The virtualized functionalities include functionalities like virtual LAN (VLAN) isolation, virtual fiber channel, and virtual Small Computer System Interface (SCSI). The health of a server includes, but is not restricted to, health of the hardware resources, such as CPU, RAM, motherboard, power supply, and fan, and health of firmware, and operating system of the server.

The VM migration module 104 utilizes the set of criteria to compute a suitability score for a plurality of candidate servers. In an example, the plurality of candidate servers is part of a data center. The suitability scores are computed for a server in the plurality of candidate servers based on satisfaction of at least one criterion of the set of criteria by the server. The computation of the suitability scores based on the satisfaction of the at least one criterion is explained in detail with reference to FIGS. 4(a) and 4(b).

Upon computation of the suitability scores for each particular server in the plurality of candidate servers, the VM migration module 104 determines a set of servers which may be suitable for migration of the VM, i.e., to be suitable is for hosting the VM. The determination is made based on the suitability scores. In an example, the set of servers includes servers that have suitability scores greater than a threshold.

From the set of servers, the VM migration module 104 selects a destination server to which the VM is to be migrated. The selection may be performed based on a second criterion. In an example implementation, the second criterion is capacity utilization of a server in the set of servers when the VM is migrated to the server. The capacity utilization of a server refers to utilization of percentage of the hardware resources, such as CPU, RAM, storage, and network bandwidth, of the server. In an example, to select a destination server from the set of servers based on capacity utilization, the VM migration module 104 selects a server having a higher percentage utilization of CPU processing power, RAM memory, storage memory, or network bandwidth than the other servers in the set of servers when the VM is migrated to the server. In an example, the VM migration module 104 selects the destination server based on capacity utilization of any, some, or all of the hardware resources. The hardware resources based on which the destination server is to be selected may be defined by a user.

To select the destination server based on the capacity utilization, the VM migration module 104 may compute the capacity utilization of each server in the set of servers when the VM is migrated to the server. The computation can be performed based on determination of the resources for usage by the VM for its operation and the availability of the hardware resources in each server in the set of servers. The determination of the resources for usage by the VM for its operation and the availability of the hardware resources in a server will be explained in detail with reference to FIG. 3. Based on the computation of the capacity utilization for each server in the set of servers, in an example implementation, the VM migration module 104 selects the server which will have a higher capacity utilization compared to the other servers in the set of servers when the VM is migrated to it. If a group of VMs is to be migrated from the source server to the destination server, the VM migration module 104 can select one or more servers, such that the overall capacity utilization of the one or more servers increases on migration of the group of VMs.

Since capacity utilization is used for selecting servers, some servers may not have any VMs running on them. These servers can be deployed in a low power mode, thereby reducing power consumption of the servers. Therefore, if the plurality of candidate servers is part of a data center, the overall power consumption of the data center is reduced. Further, since small VMs (VMs consuming less hardware resources) are migrated to a first server having lesser available capacity and achieving high capacity utilization, large VMs, which cannot be handled by the first server, can be migrated to a server that is low on capacity utilization and has a large amount of hardware resources available. Therefore, the overall capacity utilization of the data center, which the plurality of candidate servers may be part of, is improved.

In an example implementation, to migrate VMs to a server achieving a higher capacity utilization compared to other servers, the VM migration module 104 utilizes a bin packing algorithm, which involves packing objects of different volumes in bins. Using the bin packing algorithms, different objects having different volumes are fit into bins such the total number of bins used for holding the objects is minimized. Here, objects are analogous to the VMs that are to be migrated, bins are analogous to the servers, and volumes of the objects are analogous to the hardware resources for usage by the VM for its operation. Therefore, using the bin packing algorithms, the VM migration module 104 ensures that different hardware resources of some of the plurality of candidate servers are utilized, and the number of servers in the plurality of candidate servers used for hosting VMs at any point of time is minimal.

Figure 2:
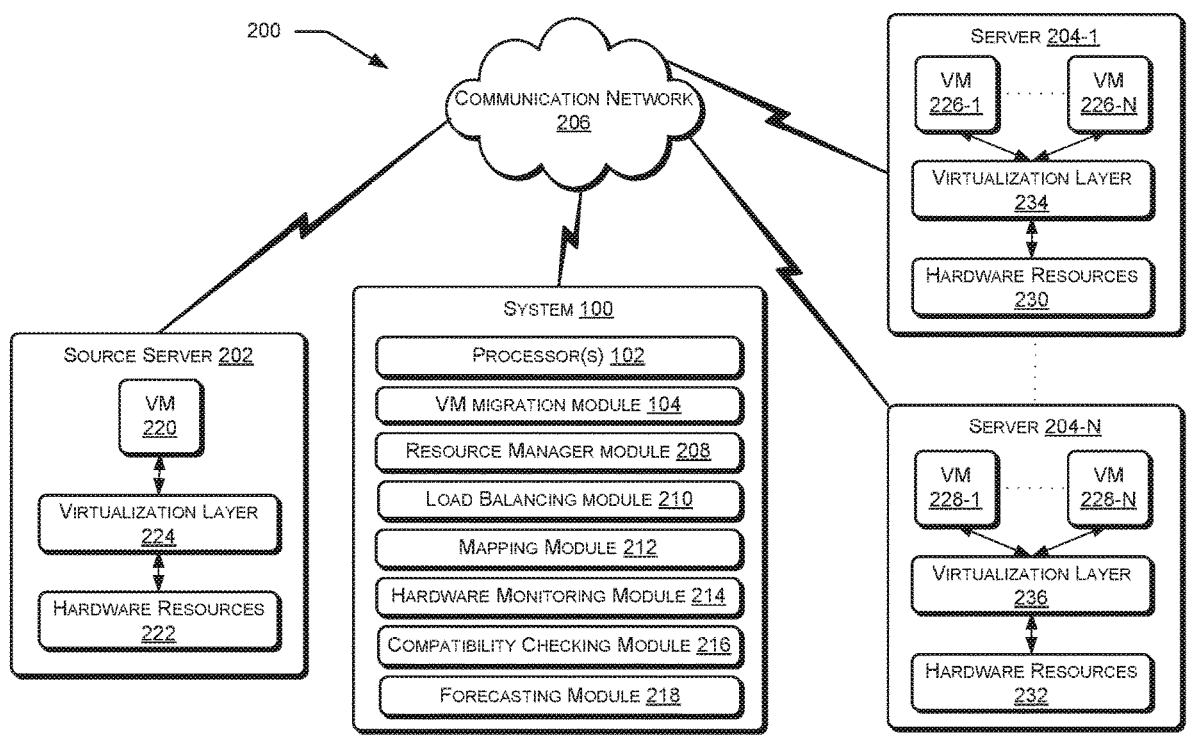
FIG. 2 illustrates a schematic representation of a network environment for migration of VM, according to an example implementation of the present subject matter.

FIG. 2 illustrates a schematic representation of a network environment 200 for migration of VM, according to an example implementation of the present subject matter. The network environment 200 may either be a public distributed environment or may be a private closed network environment. The network environment 200 includes the system 100 communicatively coupled to a source server 202 and a plurality of candidate servers 204-1, ... 204-N through a communication network 206.

The communication network 206 may be a wireless or a wired network, or a combination thereof. The communication network 206 may be a collection of individual networks, interconnected with each other and functioning as a single large network (e.g., the Internet or an intranet). Examples of such individual networks include, but are not restricted to, Global System for Mobile Communication (GSM) network, Universal Mobile Telecommunications System (UMTS) network, Personal Communications Service (PCS) network, Time Division Multiple Access (TDMA) network, Code Division Multiple Access (COMA) network, Next Generation Network (NGN), Public Switched Telephone Network (PSTN), and Integrated Services Digital Network (ISDN). Depending on the technology, the communication network 206 includes various network entities, such as transceivers, gateways, and routers.

As explained earlier, the system 100 includes processor 102, and the VM migration module 104. In one example, the system 100 also includes a resource manager module 208, a load balancing module 210, a mapping module 212, a hardware monitoring module 214, a compatibility checking module 216, and a forecasting module 218, and additional module(s) (not shown in Fig.). Further, the system 100 may also include interface(s), memory, and system data, which are not shown in FIG. 2. The system 100 may be implemented as any of a variety of computing systems, such as a desktop computer, a laptop computer, a server, a tablet, and the like.

The additional module(s) may further include programs or coded instructions that supplement applications and functions, for example, programs in the operating system, of the system 100. Though shown as separate modules, it will be understood that in other implementations, the VM migration module 104 and some or all of the other modules may be implemented as a single module. Further, the VM migration module 104, the modules 208-218, and the additional module(s) may be implemented in hardware, instructions executed by a processing unit, or by a combination thereof.

The interface(s) may include a variety of machine readable instructions-based interfaces and hardware interfaces that allow interaction with a user and with other communication and computing devices, such as network entities, web servers, and external repositories, and peripheral devices. The memory may include any non-transitory computer-readable medium including, for example, volatile memory (e.g., RAM), and/or non-volatile memory (e.g., EPROM, flash memory, Memristor, etc.). The memory may also be an external memory unit, such as a flash drive, a compact disk drive, an external hard disk drive, or the like.

The system data may serve as a repository for storing data that may be fetched, processed, received, or created by the VM migration module 104 and the other modules or received from connected computing systems and storage devices.

The source server 202 hosts a VM 220. The VM 220 utilizes hardware resources 222 of the source server 202. The hardware resources 222 of the source server 202 are provided to the VM 220 by a virtualization layer 224. Similar to the source server 202, the plurality of candidate servers 204-1, ... 204-N can also host VMs, such as VMs 226-1, ... 226-N and 228-1, ... 228-N, which utilize hardware resources, such as hardware resources 230 and 232, of the server they are hosted on, through the respective virtualization layers, such as virtualization layers 234 and 236. The VM 220 is to be migrated from the source server 202 to one of the plurality of candidate servers 204-1, ... 204-N. In an example, the source server 202 is outside a data center and the plurality of candidate servers 204-1, ... 204-N are part of the data center. In accordance with the example, the VM 220 is a VM that is to be newly migrated into the data center. Although the source server 202 is shown to host a single VM 220, it will be understood that the source server 202 can host multiple VMs. Further, any number of VMs hosted on the source server 202 may have to be migrated from the source server 202. Accordingly, the systems and methods of the present subject matter can be used for migration of any, some, or all VMs hosted on the source server 202.

As explained earlier, the VM migration module 104 selects a server from the plurality of candidate servers 204-1, ... 204-N for the migration of the VM. To enable selection of the server, the VM migration module 104 utilizes the other modules, i.e., the resource manager module 208, the load balancing module 210, the mapping module 212, the hardware monitoring module 214, the compatibility checking module 216, and the forecasting module 218. Further, the other modules also enable determining that the VM is to be migrated from the source server 202. The operation of the other modules will now be explained in detail with reference to FIG. 3.

Figure 3:
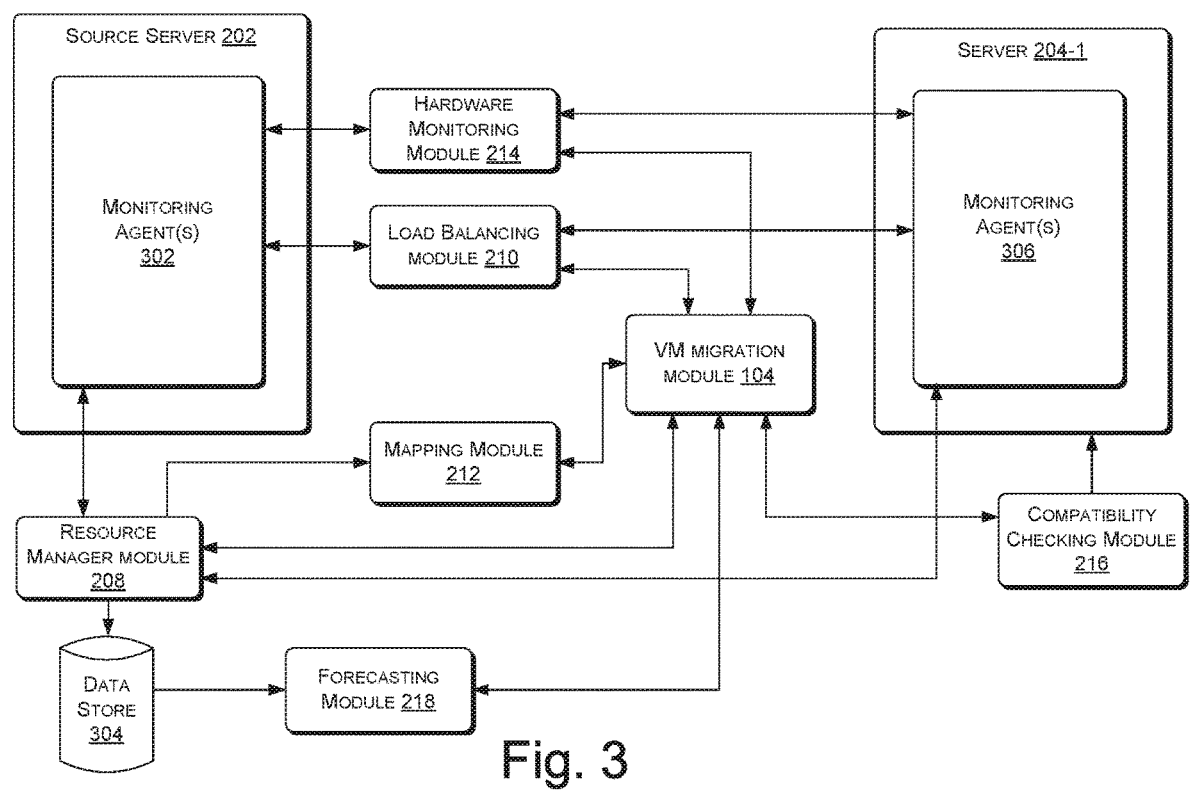
FIG. 3 illustrates operations of modules of the system for migration of a VM from the source server to the destination server, according to an example implementation of the present subject matter.

FIG. 3 illustrates operations of the other modules in migration of a VM from the source server to the destination server, according to an example implementation of the present subject matter. Here, the VM refers to any, some, or all VMs, such as VM 220, which are hosted on the source server 202. The resource manager module 208 obtains performance metrics of the source server 202. The performance metrics includes resource utilization of the source server 202, such as CPU utilization, RAM utilization, storage utilization, and network bandwidth utilization, input/output (I/O) rates, time to request, and rate of request. Here, the CPU utilization, RAM utilization, storage utilization, network bandwidth utilization refers to amount of CPU processing power, RAM memory, storage space, and network bandwidth, of the source server 202 consumed. It will be understood that the resource utilization information of the source server 202 is the sum of utilization of the resources by all the VMs that are hosted on the source server 202. I/O rate refers to the rate at which input/output requests are processed by the storage unit, such as disk, of the source server 202. Time to request refers to the time taken between submission of a request and servicing of the request. Finally, rate of request refers to the number of calls serviced per unit time.

To obtain the performance metrics of the source server 202, the resource manager module 208 communicates with a monitoring agent(s) 302 in the source server 202, which can include agents that obtain the performance metrics. Further, the monitoring agent(s) 302 can include agents which monitor temperature of the CPU of the source server 202, working condition of fan of the source server 202, diagnostic messages from the hardware, firmware, and operating system of the source server 202, and load of the source server 202.

The monitoring agent(s) 302 can obtain the CPU utilization information and the RAM utilization information from the virtualization layer 224. The storage utilization information and the I/O rate can be obtained from the storage units, such as disks, in the source server 202. For obtaining the network bandwidth utilization information, the monitoring agent(s) 302 can communicate with network elements, such as switches, through which the VM communicates. The monitoring agent(s) 302 can obtain the rate of request for different types of transactions. For example, for transactions utilizing representational state transfer (REST) calls, the time to request is obtained from the REST calls, which provide the time for servicing of the request. In case of database transactions, the monitoring agent(s) 302 can obtain the time to request by monitoring database logs to determine how much time was consumed to service a request. To obtain the rate of request for the transactions utilizing the REST calls, the monitoring agent(s) 302 can utilize logs of containers, in which processes corresponding to the REST calls are executed. For obtaining rate of request for the database transactions, the monitoring agent(s) 302 can utilize the database logs. The monitoring agent(s) 302 can utilize the container logs and the database logs to obtain the number of calls serviced. The rate of request is then calculated as number of calls serviced per unit time. The unit time can be, for example, seconds, minutes, or hours.

In an example, the monitoring agent(s) 302 stores the monitored performance metrics in JavaScript™ Object Notation (JSON) format. The resource manager module 208 can communicate with the monitoring agent(s) 302 through application programming interfaces (APIs) to obtain the monitored performance metrics.

The resource manager module 208 computes moving averages of the performance metrics for a period of time. The computation of the moving averages can be performed after normalizing the performance metrics. In an example, the period of time is 1 week. The moving averages of the resource utilization information are stored in a data store 304. The data store 304 can store the resource utilization information of all the VMs hosted in the servers in the data center.

The moving average of the resource utilization information stored in the data store 304 can be used to identify the trend of resource utilization of the VM in the past, and can also be used to forecast the demand for the hardware resources by the VM in the future. For example, history of the resource utilization information, it can be identified that the network bandwidth utilization of a VM increases by around 20% every day between 5 PM and 7 PM. Based on this identification, it can be forecast that the network bandwidth utilization of the VM will increase by 20% every day between 5 PM and 7 PM. The forecasting is performed by the forecasting module 218. Similar to the forecasting for the VM, the forecasting module 218 can perform the forecasting for all the VMs hosted on the data center. Therefore, the forecasting module 218 can forecast the demand for the hardware resources of the entire data center.

In an example implementation, the performance metrics are used to determine if the performance of the VM meets the expected performance of the VM. The performance of the VM includes the performance of the workload executing on the VM. The determination as to whether the VM meets its expected performance is made periodically to ensure that the VM, and therefore, the workload hosted on the VM, always meet their expected performance. In an example, the determination is performed once in 1 hour. The frequency at which the determination is performed can be defined by a user. To perform the determination, parameters are derived from the performance metrics and are compared with the rated values of the corresponding parameters. The parameters and their rated values are defined in an agreement between the owner of the server and owner of a workload that is running on the VM. The contract is referred to as a service level agreement (SLA) and the parameters are referred to as SLA parameters. The owner of the server is commonly referred to as a cloud service provider if the server is part of a data center. Some example SLA parameters are free storage available, free RAM memory available, bandwidth available, I/O rate for the workload, mean time to request for the workload, and rate of request for the workload. The derivation of the SLA parameters from the performance metrics of the source server 202 is also known as SLA mapping, and is performed by the mapping module 212.

The mapping module 212 derives the SLA parameters from the performance metrics either directly or with the help of mapping rules. Direct derivation of the SLA parameters refers to directly mapping a performance metric on to an SLA parameter. An example direct mapping is a mapping of the time to request to the SLA parameter 'mean time to request for the workload'. Another example of the direct mapping is a mapping of the rate of request to the SLA parameter 'rate of request for the workload'.

Mapping rules are quantitative rules that are used to derive an SLA parameter from one or more performance metrics. An example mapping rule is a storage availability mapping rule, which maps the performance metric 'storage utilization' to the SLA parameter 'free storage available'. The storage availability mapping rule is defined as below:

Free storage available=Total storage capacity of the source server−Storage utilization of all VMs hosted on the source server.

Upon their derivation, as explained earlier, the SLA parameters are compared with their rated values. The comparison can be performed by the VM migration module 104. Based on the comparison, it is determined whether the performance of the VM meets with the target performance of the VM. As mentioned earlier, the performance of the VM includes the performance of the workload running on the VM. If the rated value of the SLA parameter 'mean time to request for the workload' is 500 ms, and the actual value of the time to request is 510 ms, it is determined that the target performance of the VM is not achieved. Similarly, if the rated value of the 'free RAM memory available' SLA parameter is 2 GB, while the actually available free RAM memory is 1.8 GB, it is determined that the expected performance of the VM is not achieved. Since the achievement of the expected performance of the VM determined based on SLA parameters, meeting with the expected performance is also referred to as achieving the SLA targets.

The failure of the VM to meet with its target performance may be due to lack of available resources in the source server 202. For example, the actual value of the mean time to request for the workload may be greater than its rated value due to lack of CPU resources in the source server 202. Similarly, the actual value of the RAM memory available may be lesser than the rated value of the corresponding SLA parameter due to lack of available RAM memory in the source server 202. Therefore, if the expected performance of the VM is not achieved, the VM migration module 104 determines that the VM is to be migrated from the source server 202. In other words, based on the comparison of the derived SLA parameters with the rated values of the SLA parameters, the VM migration module determines that the VM is to be migrated from the source server 202.

The VM migration module 104 can determine that the VM is to be migrated from the source server 202 based on other factors as well. The other factors include, but are not restricted to, degradation in health of the source server 202, increase in load of the source server 202 beyond a first threshold, decrease in load of the source server 202 less than a second threshold, forecast increase in load of the VM, and instructions from the owner of the source server 202. Here, as mentioned earlier, health of a server includes health of the hardware resources, such as CPU, RAM, motherboard, power supply, and fan, and health of firmware, and operating system, of the server of the source server 202. Further, the degradation in health of the server also includes increase in temperature of the server and power consumption of the server beyond acceptable limits.

To determine the degradation in the health of the source server 202, the system 100 utilizes the hardware monitoring module 214. In an example implementation, the hardware monitoring module 214 communicates with the monitoring agent(s) 302 periodically, which communicates the metrics, such as temperature of the CPU and working condition of the fan, and diagnostic messages from the hardware, firmware, and operating system of the source server 202 to the hardware monitoring module 214. Based on the metrics, the hardware monitoring module 214 then monitors health, and consequently, the degradation in the health of the source server 202, and communicates to the VM migration module 104 if the health of the source server 202 has degraded.

The load of a server refers to the resource utilization of the server. If the load of the source server 202 is high, the health of the source server 202, the performance of the source server 202, or the performance of the VM may be affected. Therefore, when the load of the source server 202 increases beyond a first threshold, the load balancing module 210, which monitors the load of the source server 202, communicates to the VM migration module 104, which then determines that the VM is to be migrated from the source server 202. The load balancing module 210 can communicate to the VM migration module 104 when utilization of any of the resources, such as CPU, RAM memory, storage memory, and network bandwidth, of the source server 202 increases beyond the first threshold. In an example, the first threshold is 95% of total resources of the server. The load balancing module 210 can monitor load of the source server 202 by communicating with the monitoring agent(s) 302.

The VM migration module 104 can determine that the VM is to be migrated from the source server 202 also when load balancing module 210 communicates to the VM migration module 104 that the load of the source server 202 is below a second threshold. The load of the source server 202 being below the second threshold implies that all VMs hosted on the source server 202 may be migrated to other servers in the plurality of candidate servers 204-1, ... 204-N without any significant performance overhead to the other servers. If all the VMs hosted on the source server 202 are migrated, the source server 202 can be deployed in a low power mode, such as an off mode or a sleep mode, thereby reducing the power consumption of the source server 202 and the data center in which the source server 202 is located. Therefore, in an example implementation, when the load of the source server 202 decreases below the second threshold, the VM migration module 104 migrates the VM from the source server 202. The VM migration module 104 can migrate the VM from the source server 202 when the utilization of any of the resources drops below the second threshold. In an example, the second threshold is 10% of total resources of the server. The resource based on which the VM migration is decided can be defined by a user. The VM migration module 104 can also deploy the source server 202 on a low power mode. The load balancing module 210 communicates with the monitoring agent(s) 302 periodically to determine the load of the source server 202, so that if the load breaches the first threshold or the second threshold, the VM migration module 104 can be informed. The period can be, for example, 1 hour.

The source server 202 can then be deployed on the active mode, for example, by turning on or waking the source server 202, when the forecasting module 218 forecasts an increase in the load of the data center. The forecasting module 218 forecasts the load of the data center periodically for enabling deployment servers in the data center on a low power mode or an active mode.

When the forecasting module 218 forecasts an increase in the load of the VM, the forecasting module 218 can communicate the forecast to the VM migration module 104. The VM migration module 104 can then determine that the VM is to be migrated from the source server 202 if the source server 202 cannot provision additional resources to the VM for achieving the SLA targets of the VM. The VM migration module 104 can receive expected increase in load from a user, such as owner of the workload running on the VM, based on an expected increase in resources used for the workload. For example, the user can specify that the network traffic to the workload is expected to increase by 20% in the next month. The VM migration module 104 can then determine that the VM is to be migrated from the source server 202 based on the expected increase in the load.

The VM migration module 104 can determine that the VM is to be migrated from the source server 202 on receiving instructions from the owner of the source server 202. When the source server 202 is located outside the data center, and the VMs in the source server 202 are to be migrated from the source server, for example, for moving the VMs to the cloud network, the owner of the source server 202 can provide instructions to the VM migration module 104 to migrate all the VMs on the source server 202. The owner of the source server 202 can provide instructions for migration of the VM, for example, when the owner expects an increase in resources used for the workload running on the VM and that the VM cannot achieve its SLA targets if the VM is hosted on the source server 202.

Upon determination that the VM is to be migrated, the mapping module 212 computes the resources for usage by the VM for its operation. The resources for usage by the VM for its operation refer to the amount of resources for usage by the VM that will ensure that the expected performance of the VM is met with, i.e., the SLA targets are achieved. The mapping module 212 determines the resources for usage by the VM for its operation based on one or more metrics. The one or more metrics include, but are not restricted to, the rated values of SLA parameters and the resource utilization of the VM. For example, the VM resource mapping module 308 determines the bandwidth for the operation of the VM based on the rated value of the SLA parameter 'bandwidth'. In another example, the VM resource mapping module 308 determines the RAM memory for the operation of the VM based on the rated value of the SLA parameter 'I/O rate' and number of I/O operations for the VM. In another example, the VM resource mapping module 308 determines CPU for the operation of the VM based on the rated value of the SLA parameter 'mean time to request' and the number of requests per second from the VM.

As mentioned earlier, the set of criteria includes the availability of each of the resources for usage by the VM for its operation. Therefore, to select the set of servers from the plurality of candidate servers 204-1, ... 204-N, the VM migration module 104 checks if the resources for usage by the VM for its operation are available in the plurality of candidate servers 204-1, ... 204-N. To perform the check, the resource manager module 208 obtains the performance metrics of each particular server, such as server 204-1, in the plurality of candidate servers 204-1, ... 204-N from its respective monitoring agent(s) 306. Here, in FIG. 3, the resource manager module 208 is shown to communicate with server 204-1, and not with the other servers in the plurality of candidate servers 204-1, ... 204-N for the sake of clarity. However, it is to be understood that the resource manager module 208 communicates with all servers in the plurality of candidate servers 204-1, 204-N. The resource manager module 208 then communicates the performance metrics of the plurality of candidate servers 204-1, ... 204-N to the VM migration module 104. Based on the performance metrics of each particular server in the plurality of candidate servers 204-1, ... 204-N, the VM migration module determines the servers that have the resources for usage by the VM for its operation.

Further, as mentioned earlier, the set of criteria also includes the health of the server. For this, the hardware monitoring module 214 monitors the heath of each particular server in the plurality of candidate servers 204-1, ... 204-N, and communicates the health information of the plurality of candidate servers 204-1, ... 204-N to the VM migration module 104, which can then utilize the information for selection of the destination server.

The VM migration module 104 also utilizes compatibility information for each particular server in the plurality of candidate servers 204-1, ... 204-N provided by the compatibility checking module 216 to determine whether the VM is compatible with the server or not. The compatibility information includes, but is not restricted to, server-firmware compatibility and compatibility of the VM with the attributes of the resources of the server, which are part of the set of criteria.

The utilization of the set of criteria for computation of the suitability scores for the plurality of candidate servers is now explained in detail with reference to FIGS. 4(*a*) and 4(*b*).

FIGS. 4(*a*) and 4(*b*) illustrate suitability scores computed for a plurality of candidate servers, according to example implementations of the present subject matter. As illustrated in FIG. 4(*a*), the set of criteria includes six criteria— criterion 1, criterion 2, ... and criterion 6. The set of criteria may be specified by an expert who is aware of the criteria for the operation of the VM. Here, the set of criteria is shown to have six criteria. However, it is to be understood that the set of criteria can include any number of criteria. At least one criterion in the set of criteria may be assigned a score based on the priority of the at least one criterion for the operation of the VM. A higher score indicates a higher priority of the at least one criterion for the operation of the VM. Referring to FIG. 4(*a*), criterion-3 has a score of 10, while criterion-6 has a score of 4. Therefore, criterion-3 has a higher priority compared to the criterion-6 for the operation of the VM. Although FIG. 4(*a*) illustrates that all criteria in the set of criteria form part of the at least one criterion, to which a score is assigned, the at least one criterion may include lesser number of criteria than the set of criteria. For example, the at least one criterion includes the criterion-1 and criterion-6 alone. Consequently, the score would be assigned to the criterion-1 and criterion-6 alone, and not to the other criteria. A selection of the at least one criterion from the set of criteria may be performed by the expert. In an example, the at least one criterion includes criteria having a high priority for the operation of the VM. In accordance with the example, the suitability score for a server can be computed with a minimal number of criteria having a high priority for the operation of the VM. In another example, the at least one criteria includes all criteria that are part of the set of criteria.

The score for the at least one criterion may also be specified by the expert, who is aware of the dependence of the VM on the at least one criterion. The assignment of scores to the criteria based on their priority is explained with the help of an example.

Consider that criterion-3 is the compatibility of the VM with the attributes of the CPU. Consider also that the criterion-3 is of a very high priority, i.e., the operation of the VM has very high dependence on the compatibility of the VM with the CPU attributes of the server it is hosted on. In such a case, the expert, who is aware of the dependence, assigns the highest score, say 10, to the criterion-3. Further, consider that criterion-2 is the ability of a server to host the VM and a second VM which is part of a group that the VM is part of. Consider also that, for the operation, the VM heavily depends on the presence of the second VM in the same server as itself. In such a case, the expert can assign a score of 9 for the criterion-2. Still further, consider that criterion-6 is the availability of virtual fiber channel in the server. If the VM is not heavily dependent on the availability of the virtual fiber channel in the server, the expert can assign a lesser score, say 4, to the criterion-6. Here, the scores are shown to be on a scale of 1-10. However, it is to be understood that any scale of scoring can be used, such as 1-5 or high-medium-low.

The scores assigned to the at least one criterion is used to compute the suitability scores for each particular server in the plurality of candidate servers 204-1, ... 204-N.

FIG. 4(*b*) illustrates computation of suitability scores for a plurality of candidate servers. Here, the plurality of candidate servers is shown to include four servers—server-1, server-2, server-3, and server-4—for the sake of clarity. However, it is to be understood that the plurality of candidate servers can have any number of servers. The suitability score for a server is computed based on satisfaction of the at least one criterion of the set of criteria by the server. As explained earlier, the at least one criterion is shown to include all six criteria that form the set of criteria. However, the at least one criterion may have lesser number of criteria also. When a server satisfies a criterion of the at least one criterion, the score corresponding to the criterion is assigned to the server. In accordance with the example in which compatibility of the VM with the CPU attributes is provided a score of 10, consider a case where the VM is compatible with a CPU having the following CPU attributes: CPU generation: Intel® Core™ fifth generation, clock frequency: 2.9 GHz, and threads per core: two. In such a case, a server satisfying the criterion 'compatibility of the VM with the CPU attributes', i.e., having CPU with the above mentioned attributes, will be given a score of 10. Similarly, in accordance with the example in which the ability of the server to host the VM and the second VM was provided a score of 9, a server having adequate resources available for hosting both the VM and the second VM is assigned a score of 9. Further, in accordance with the example in which the availability of virtual fiber channel was provided a score of 4, a server having the virtual fiber channel is assigned a score of 4. Continuing in a similar manner, the satisfaction of each criterion of the at least one criterion by each server is checked, and scores are assigned to each server on the satisfaction of each criterion. Thereafter, the scores assigned to each server are summed up to arrive at the server's suitability score.

Referring back to FIG. 4(b), server-1 satisfies the criterion-1 (score 7), criterion-2 (score 9), criterion-3 (score 10), and criterion-6 (score 4). Therefore, server-1 is computed to have a suitability score of 30 (7+9+10+4). In a similar manner, servers 2, 3, and 4 are computed to have suitability scores of 14, 27, and 26 respectively.

Upon computation of the suitability scores for the plurality of candidate servers, in an example implementation, a set of servers is shortlisted from the plurality of candidate servers. In an example, the set of servers includes servers having suitability score greater than a threshold. The threshold can be set based on the total of scores assigned to each criterion of the at least one criterion. For example, if total of the scores assigned to each criterion of the at least one criterion is 60, the threshold can be 35. The threshold can be set, for example, by the expert. In accordance with the illustration of FIGS. 4(a) and 4(b), the threshold can be, for example 20. When the threshold is 20, the set of servers includes the servers 1, 3, and 4, which have suitability scores of 30, 27, and 26 respectively. Thereafter, the capacity utilization of the servers 1, 3, and 4, when the VM is migrated to them, are checked, and the server having a higher capacity utilization compared to the other servers is selected to be the destination server. In an example implementation, the server having the higher capacity utilization of any of the resources on migration of the VM can be selected as the destination server. For example, a server having higher CPU utilization compared to other servers on migration of the VM can be selected as the destination server. In another example implementation, a higher average of capacity utilization of one or more of the resources can be considered for selection of the destination server. For example, the average of capacity utilization of CPU, capacity utilization of storage, and capacity utilization of network bandwidth of each server can be computed and compared against the average of other servers for selecting the destination server. The VM can then be migrated to the destination server. In another example implementation, the plurality of candidate servers is ranked based on their scores, and top 'n' ranked servers for part of the set of servers. In an example 'n' is 3.

The table of FIG. 4(b) can be displayed to a user through a user interface, based on which the user can discern the satisfaction of various criteria by different servers in the data center. Some of the suitability scores can be distinguished from others to indicate the suitability of a server to host the VM. For example, the suitability score of server-1 is shown with a large number of dots to indicate that the server-1 is the most suitable server to host the VM. Similarly, the suitability scores of the servers 3 and 4 are shown with lesser number of dots to indicate their lesser suitability compared to server-1 to host the VM.

an example implementation, the VM is migrated from the source server 202 to the destination server through a shortest path connecting the source server 202 and the destination server. The migration of the VM from the source server 202 to the destination server through the shortest path enables minimizing network resources expended in migrating the VM from the source server 202 to the destination server. For migration using the shortest path, the VM migration module 104 utilizes a shortest path searching algorithm.

Figure 5:
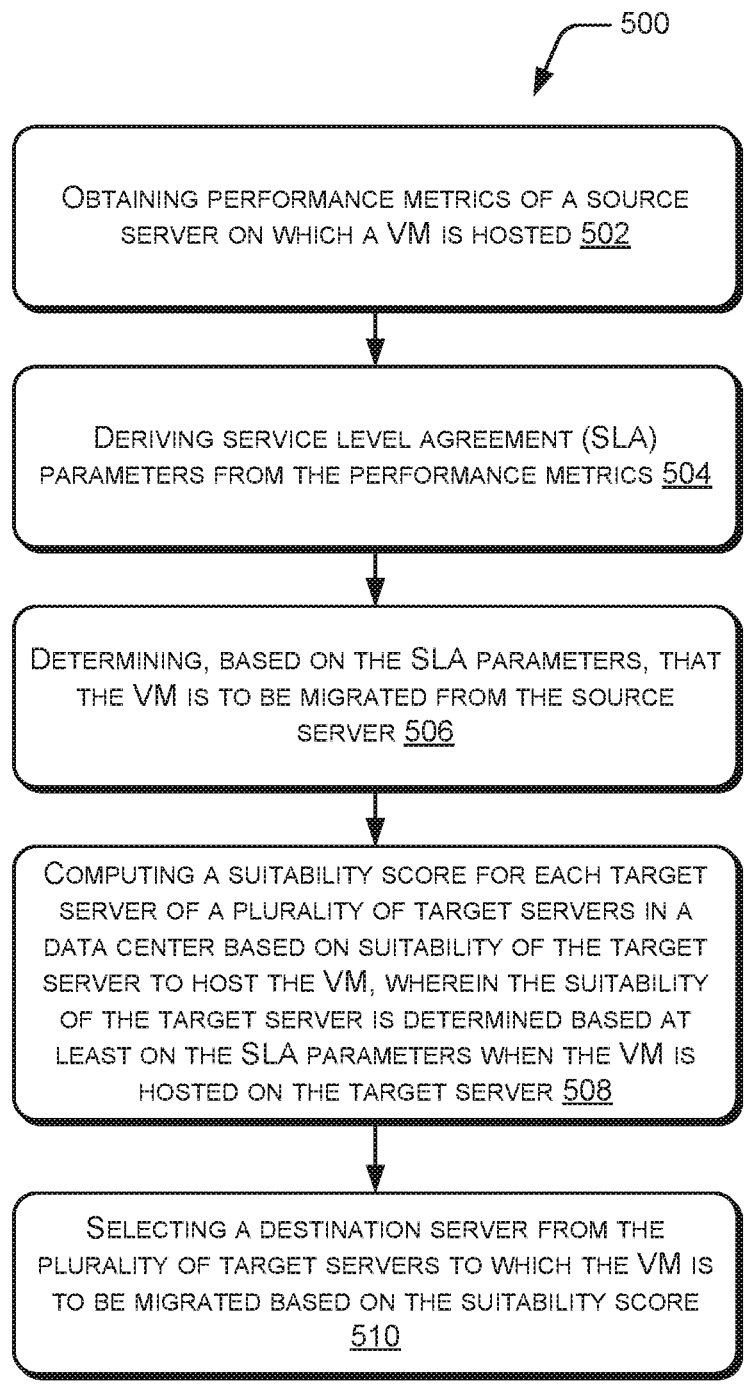
FIG. 5 illustrates a method for selecting a destination server to which a VM is to be migrated, according to an example implementation of the present subject matter.

FIG. 5 illustrates a method 500 for selecting a destination server to which a VM is to be migrated, according to an example implementation of the present subject matter.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 500 may be implemented in a variety of systems; the method 500 is described in relation to the aforementioned system 100, for ease of explanation.

Referring to the method 500, at block 502, performance metrics of a source server are obtained. The source server hosts a VM. In an implementation, the performance metrics are obtained by the resource manager module 208 by communicating with a monitoring agent of the source server.

At block 504, SLA parameters are derived from the performance metrics. The SLA parameters can be derived by the mapping module 212.

At block 506, based on the SLA parameters, it is determined that the VM is to be migrated from the source server. The determination can be made, for example, when the SLA parameters do not achieve the SLA targets.

At block 508, a suitability score is computed for a plurality of target servers. The plurality of candidate servers may be part of a data center. The suitability score for a target server is computed based on the suitability of the target server to host the VM. In an example, the suitability of the target server to host the VM is determined based on the ability of the VM to achieve the SLA targets when the VM is hosted on the target server. In other words, the suitability is determined based at least on the SLA parameters when the VM is hosted on the target server. The suitability score can be computed by the VM migration module 104.

At block 510, a destination server is selected from the plurality of target servers to which the VM is to be migrated based on the suitability score. In an example, the destination server may be a server having the highest suitability score. The selection of the destination server can be performed by the VM migration module 104.

Since a destination server for hosting a VM is selected based on the suitability of the destination server to host the VM, using the methods of the present subject matter, it can be ensured that the SLA targets for the VM are always achieved. Therefore, the performance of the VM, and consequently, the performance of the workload running on the VM, can be guaranteed.

In an example implementation, the selection of the destination server may depend on a second criterion. The second criterion can be, for example, capacity utilization of a server when the VM is migrated to the server.

Figure 6:
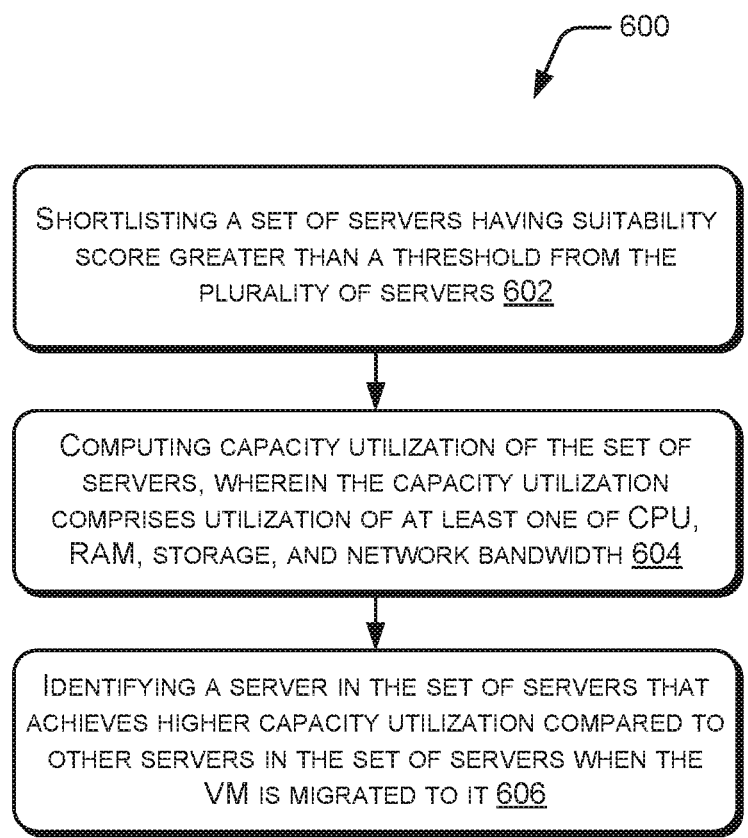
FIG. 6 illustrates a method for selecting a destination server to which a VM is to be migrated based on capacity utilization, according to an example implementation of the present subject matter.

FIG. 6 illustrates a method 600 for selection of a destination server to which the VM is to be migrated based on capacity utilization, according to an example implementation of the present subject matter.

The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 600 may be implemented in a variety of systems; the method 600 is described in relation to the aforementioned system 100, for ease of explanation.

Referring to the method 600, at block 602, a set of servers having a suitability score greater than a threshold is shortlisted.

At block 604, capacity utilization of each server in the set of servers when the VM is migrated to the server is computed. As explained earlier, the capacity utilization includes utilization of CPU, RAM, storage, and network bandwidth.

At block 606, a server in the set of servers that achieves higher capacity utilization compared to other servers in the set of servers when the VM is migrated to the server is selected as the destination server.

Figure 7:
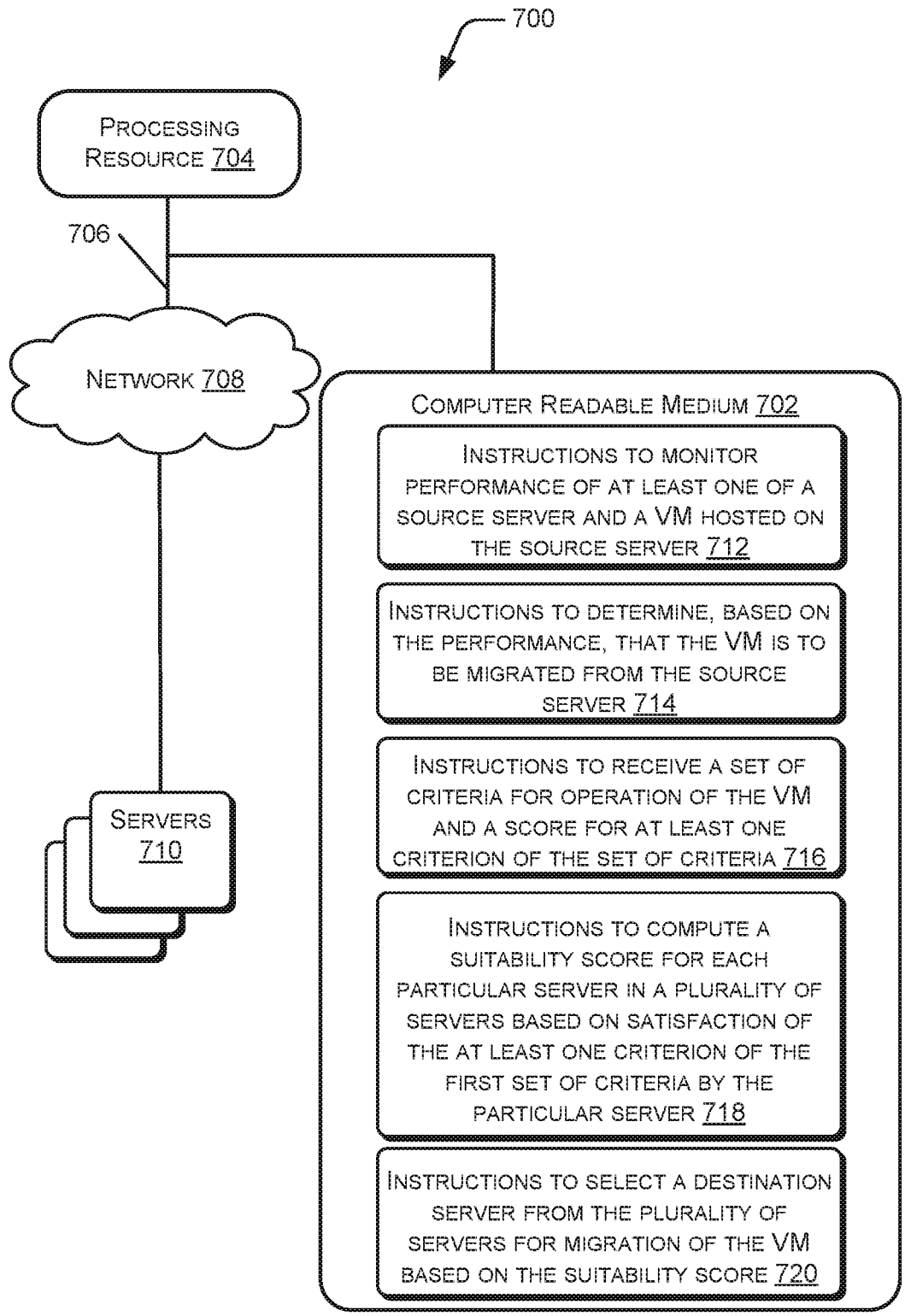
FIG. 7 illustrates a computing environment 700, implementing a non-transitory computer-readable medium 702 for migration of VMs, according to an example implementation of the present subject matter.

FIG. 7 illustrates a computing environment 700, implementing a non-transitory computer-readable medium 702 for migration of virtual machines, according to an example implementation of the present subject matter.

In an implementation, the non-transitory computer readable medium 702 may be utilized by a computing system, such as the system 100. The system 100 may be implemented in a public networking environment or a private networking environment. In one implementation, the computing environment 700 may include a processing resource 704 communicatively coupled to the non-transitory computer readable medium 702 through a communication link 706.

In an example, the processing resource 704 may be implemented in a computing system, such as the system 100 described earlier. The non-transitory computer readable medium 702 may be, for example, an internal memory device or an external memory device. In one implementation, the communication link 706 may be a direct communication link, such as any memory read/write interface. In another implementation, the communication link 706 may be an indirect communication link, such as a network interface. In such a case, the processing resource 704 may access the non-transitory computer readable medium 702 through a network 708. The network 708 may be a single network or a combination of multiple networks and may use a variety of different communication protocols.

Further, the processing resource 704 and the non-transitory computer readable medium 702 may also communicate with various servers 710, such as servers in a data center.

In an example implementation, the non-transitory computer readable medium 702 includes a set of computer readable instructions to enable migration of VMs. The set of computer readable instructions can be accessed by the processing resource 704 through the communication link 706 and subsequently executed to perform acts to enable migration of the VMs. In an example, the processing resource 704 executes the computer readable instructions in response to instructions from user to migrate a VM from a source server, for example, to perform maintenance activities on the source server.

Referring to FIG. 7, in an example, the non-transitory computer readable medium 702 includes instructions 712 that cause the processing resource 704 to monitor performance of at least one of a source server and a VM being hosted on the source server. The performance of the VM may include performance of a workload hosted on the VM. In an example, the performance of the source server is monitored by monitoring at least one of health of the source server and the load of the source server. Further, in an example, the performance of the VM is monitored by computing SLA parameters of the VM, and comparing the SLA parameters with rated values of the SLA parameters.

The non-transitory computer readable medium 702 includes instructions 714 that cause the processing resource 704 to determine, based on the performance, that the VM is to be migrated from the source server. The determination may be made, for example, when the health of the source server is degrading of the SLA targets of the VM are not achieved.

The non-transitory computer readable medium 702 includes instructions 716 that cause the processing resource 704 to receive a set of criteria for operation of the VM and a score for at least one criterion of the set of criteria.

The non-transitory computer readable medium 702 includes instructions 718 that cause the processing resource 704 to compute a suitability score for each particular server in a plurality of candidate servers based on satisfaction of at least one criterion of the set of criteria by each particular server in the plurality of candidate servers. The computation can be performed in a manner as described in the description of FIGS. 4(a) and 4(b).

The non-transitory computer readable medium 702 includes instructions 720 that cause the processing resource 704 to select a destination server from the plurality of candidate servers for migration of the VM based on the suitability score. In an example implementation, the non-transitory computer readable medium 702 can include instructions to select the destination server based on an additional second criterion. The second criterion, can be, for example, capacity utilization of the destination server.

Although implementations of systems and methods for migration of virtual machines have been described in language specific to structural features and/or methods, it is to be understood that the present subject matter is not necessarily limited to the specific features or methods described. Rather, the specific features and methods are disclosed and explained as example implementations.

We claim:

1. A system comprising:
    a processor;
    virtual machine (VM) migration instructions executable on the processor to:
        receive a set of criteria for an operation of a virtual machine (VM) and corresponding score for each criterion in the set of criteria, the VM being hosted on a source server;
        compute a suitability score for each respective server of a plurality of candidate servers based on a satisfaction of the criterion in the set of criteria by the respective server, the suitability score for the respective server computed based on the scores of corresponding criteria satisfied by the respective server, the corresponding criteria included in the set of criteria;
        determine, based on the suitability score of each respective server in the plurality of candidate servers, a set of servers of the plurality of candidate servers having a suitability score greater than a threshold;
        select a destination server from the set of servers onto which the VM is to be migrated based on a capacity utilization criterion, wherein the selected destination server comprises a server in the set of servers having a highest capacity utilization of hardware resources; and
        migrate the VM from the source server to the destination server.

2. The system of claim 1, comprising:
    resource manager instructions are executed on the processor to obtain performance metrics of the source server, the performance metrics comprising plural performance metrics selected from the group consisting of central processing unit (CPU) utilization, random access memory (RAM) utilization, storage utilization, network bandwidth utilization, input/output (I/O) rate, time to request, and rate of request; and
    mapping instructions are executed on the processor to derive service level agreement (SLA) parameters from the performance metrics;
    wherein the VM migration instructions are executed on the processor to compare the SLA parameters with rated values of the SLA parameters to determine that the VM is to be migrated from the source server.

3. The system of claim 2, wherein the mapping instructions are executable on the processor to compute resources for usage by the VM for its operation based on the rated values of SLA parameters, the resources for usage by the VM comprising at least one of an amount of CPU processing power, an amount of RAM memory, an amount of storage, or an amount of network bandwidth, wherein the set of criteria comprises availability of each of the resources for usage by the VM.

4. The system of claim 1, comprising hardware monitoring instructions executable on the processor to monitor a health of the source server for enabling determination that the VM is to be migrated from the source server.

5. The system of claim 1, comprising load balancing instructions executable on the processor to monitor a load of the source server, wherein in response to determining the load of the source server being less than a second threshold, the VM migration instructions are executable on the processor to further transition the source server to a low power mode.

6. The system of claim 1, comprising a forecasting instructions executable on the processor to forecast an increase in resource utilization of the VM for enabling a determination that the VM is to be migrated from the source server.

7. The system of claim 1, wherein the VM migration instructions are executable on the processor to compute the suitability score for the respective server by:
    applying a calculation on the plurality of scores of each of the corresponding criteria satisfied by the respective server, the calculation producing the suitability score of the respective server.

8. The system of claim 1, wherein the VM migration instructions are executable on the processor to compute the suitability score for the respective server by:
    summing the scores of the corresponding criteria satisfied by the respective server, the summing producing the suitability score of the respective server.

9. The system of claim 1, wherein the threshold is based on a total of scores of each criterion in the set of criteria.

10. A method comprising:
    obtaining, by a system comprising a processor, performance metrics of a source server on which a virtual machine (VM) is hosted;
    deriving, by the system, service level agreement (SLA) parameters from the performance metrics;
    determining, by the system, based on the SLA parameters, that the VM is to be migrated from the source server;
    receiving, by the system, a set of criteria for an operation of the VM and corresponding score for each criterion in the set of criteria;
    computing, by the system, a suitability score for each respective target server of a plurality of target servers in a data center based on a satisfaction of the criterion in the set of criteria by the respective target server, the suitability score for the respective target server computed based on applying a calculation on the scores of corresponding criteria satisfied by the respective target server, the corresponding criteria included in the set of criteria;
    determining, based on the suitability score of each respective target server, a set of servers of the plurality of target servers having a suitability score greater than a threshold;
    selecting, by the system, a destination server from the set of servers to which the VM is to be migrated based on a capacity utilization criterion, wherein the selected destination server comprises a server in the set of servers having a highest capacity utilization of hardware resources; and
    migrate the VM from the source server to the destination server.

11. The method of claim 10, wherein the set of criteria comprises a given criterion indicating that the VM is dependent on a second VM for the operation of the VM, and wherein computing the suitability score for the respective target server of the plurality of target servers comprises:
    determining whether the respective target server is capable of hosting the VM and the second VM simultaneously, wherein applying the calculation comprises applying the calculation on a score of the given criterion to compute the suitability score.

12. The method of claim 10, wherein the set of criteria comprises plural criteria selected from a group consisting of target server firmware-VM compatibility, ability of the respective target server to support the VM and workloads running on the VM, availability of resources for usage by the VM for its operation, compatibility of the VM with attributes of resources of the respective target server, availability of storage area network (SAN) features to the respective target server, compatibility of a SAN type with the VM, processor availability for the VM, contiguous memory availability for the VM, processor-memory collocation, availability of virtualized functionalities on the respective target server, ability of the respective target server to host other VMs which are part of a group that the VM is also part of, availability of buffer resources on the respective target server, ability of the respective target server to utilize best available network traffic between the respective target server and the source server for migration of the VM, or health of the respective target server.

13. The method of claim 10, wherein selecting the destination server comprises:
computing the capacity utilization of the set of servers, wherein the capacity utilization comprises a utilization of at least one of a central processing unit (CPU), a memory, a storage, or a network bandwidth; and
identifying a given server in the set of servers that achieves higher capacity utilization compared to other servers in the set of servers when the VM is migrated to the given server.

14. The method of claim 10, wherein the threshold is based on a total of scores of each criterion in the set of criteria.

15. A non-transitory computer-readable medium comprising instructions for selecting a destination server for migration of a virtual machine (VM), the instructions being executable by a processing resource to:
monitor performance of a source server and the VM being hosted on the source server;
determine, based on the performance, that the VM is to be migrated from the source server;
receive a set of criteria for operation of the VM and corresponding score for each criterion in the set of criteria, wherein the set of criteria comprises a plurality of criteria selected from a group comprising an ability of the respective target server to support the VM and workloads running on the VM, availability of resources for usage by the VM for its operation, contiguous memory availability for the VM, processor-memory collocation, or a combination thereof;
compute a suitability score for each respective server of a plurality of candidate servers based on satisfaction of the criterion in the set of criteria by the respective server, the suitability score for the respective server computed based on the scores of corresponding criteria satisfied by the respective server, the corresponding criteria included in the set of criteria;
determine, based on the suitability score of each respective server of the plurality of candidate servers, a set of servers of the plurality of candidate servers having a suitability score greater than a threshold; and
select a destination server from the set of servers for migration of the VM based on a capacity utilization criterion, wherein the selected destination server comprises a server in the set of servers having a highest capacity utilization of hardware resources; and
migrate the VM from the source server to the destination server.

16. The non-transitory computer-readable medium of claim 15, wherein the instructions are further executable by the processing resource to:
monitor performance of the source server by at least one of monitoring a health of the source server or a load of the source server; and
monitor performance of the VM by computing service level agreement (SLA) parameters and comparing the SLA parameters with rated values of the SLA parameters.

17. The non-transitory computer-readable medium of claim 15, wherein the threshold is based on a total of scores of each criterion in the set of criteria.

* * * * *